Patented Apr. 15, 1947

2,419,010

UNITED STATES PATENT OFFICE 2,419,010

POLYVINYL FLUORIDE

Donald D. Coffman and Thomas A. Ford, Wilmington, Del., assignors to E. I. du Pont de Nemours & Company, Wilmington, Del., a corporation of Delaware No Drawing. Application November 19, 1943, Serial No. 510,966

12 Claims. (Cl. 260—88)

This invention relates to the preparation of polymeric materials and more particularly to new vinyl fluoride polymers and the method of obtaining them.

Certain synthetic polymeric products possess a combination of value physical properties including high tensile strength and flexibility which is usually identified as toughness. But few types of the available polymers possess these properties together with that of capability of being formed, as in the case of the superpolyamides, into strong molecularly oriented films, filaments, etc. without also possessing other properties that are undesirable in many applications. Thus many of the known polymers are deficient in resistance to moisture, being permeable to water or subject to swelling and loss of flexural strength through exposure to conditions of high humidity. Others are useful only within a limited range of temperatures, their usefulness at temperatures above normal being limited by such factors as melting, softening, and thermal decomposition manifested in discoloration, embrittlement, or other loss of properties or their usefulness at normal or subnormal temperatures being limited by inherent brittleness. Products obtained by compounding the known polymers with plasticizers, stabilizers, fillers, etc., are often improved with respect to one or more of their properties, but apart from the fact that such modification involves extra steps in the preparation or fabrication of these materials, it is found that improvement in one property, e. g., flexibility, by such means is generally accompanied by detriment to some other property, e. g., temperature range of usefulness.

The polyvinyl halides constitute a known class of polymeric materials of which the most readily prepared include polyvinyl chloride, polyvinyl bromide, and polyvinyl iodide. Vinyl fluoride has been known for a long time, and has been set apart, by those who have experimented separately therewith, from the other vinyl halides through the fact that it is very difficult to polymerize (United States Patent 2,068,424 and British Patent 465,520) in contrast to vinyl chloride, vinyl bromide, and vinyl iodide which polymerize with ease under a variety of conditions. The processes disclosed in the art for the polymerization of vinyl halides are not generally applicable to the polymerization of vinyl fluoride, giving in most cases no polymer at all. In those cases in which polymerized vinyl fluoride is obtained the polymer resembles in physical properties the other vinyl halides in being shock-brittle at ordinary temperature and in lacking general utility. Starkweather (J. A. C. S. 56, 1870 (1934)) describes a process which may be used to obtain low yields of polyvinyl fluoride, but the polymer so obtained does not give continuous films.

This invention has as an object the production of new synthetic polymers which have the previously mentioned desirable combination of physical properties, namely, toughness and utility over a wide range of temperature and humidity conditions. A further object is the preparation of vinyl fluoride polymers having these properties. Still further objects reside in methods for obtaining these polymers. Other objects will appear hereinafter.

The above objects are accomplished by polymerizing vinyl fluoride under the conditions disclosed herein wherein orientable polyvinyl fluoride is formed, these conditions involving a pressure of at least 150 atmospheres in the presence of an organic peroxy compound, and continuing the reaction under such pressure until a substantial amount of vinyl fluoride has been converted to orientable polyvinyl fluoride.

Although the organic peroxy compound which promotes the reaction is consumed it may be regarded as a catalyst according to common usage since only a small proportion is needed to bring about the polymerization of a relatively large amount of vinyl fluoride. When running as a batch process, it is convenient simply to add the catayst to the reaction vessel before closing. In this case the reaction will slow down as the catalyst becomes exhausted, and when the pressure no longer falls at a measurable rate the reaction is considered to be complete. Any organic peroxy compound, that is, an organic compound containing the —O—O— linkage, can be employed as the catalyst or promoter for the polymerization, for example, ascaridole, tert.-butyl hydrogen peroxide, alkyl peroxides, acyl peroxides, etc. The diacyl peroxides, typified by benzoyl peroxide, diacetyl peroxide, and benzoyl propionyl peroxide, and the dialkyl peroxides as typified by diethyl peroxide are especially suitable because they are easy to handle and highly effective when present in small proportions. The quantity of catalyst used may vary between .005 to 5% based on the weight of the monomer employed. Smaller proportions of catalyst generally result in an uneconomically low conversion of the monomer, while proportions in excess of 5% are wasteful and may have a deleterious effect on the properties of the polymer. Proportions in the range of .05-.5% are usually most satisfactory.

The orientable vinyl fluoride polymers of this invention cannot be obtained at pressures ordinarily referred to as "high," but only at pressures above 150 atmospheres, and preferably from 200 to 1000 atmospheres, for which specially designed equipment is used.

The temperature used must be suited to the catalyst employed, the lower limit being determined by the temperature at which the catalyst becomes active, that is the temperature at which the particular peroxy compound begins to dissociate, and the upper limit is determined by the temperature at which the vinyl fluoride monomer or polymer suffers an undesirable degree of thermal decomposition, which is in the neighborhood of 250° C. Pressure and temperature are interdependent variables, and the ranges chosen will depend also upon the limitations of the apparatus employed and on the reaction rate and polymer properties desired. To obtain the most useful products, the pressure should be adjusted to the temperature and other reaction variables. The use of a higher temperature requires the use of a higher pressure to obtain a product of equivalent melt or solution viscosity. The manner in which these variables depend upon one another will be illustrated in the examples. In most instances for practical operation the temperature is at least 50° C., although in the case of some catalysts appreciable reaction can take place at a temperature as low as 30° C. The most desirable temperatures are within the range of from 50° C. to 200° C. which are used in conjunction with pressures in the range of from 150 to 2000 atmospheres. The optimum temperature for benzoyl peroxide is from 50° to 120° C. At lower temperatures the reaction is too slow for economical operation and above this temperature the consumption of the catalyst, by reason of side reactions such as hydrolysis, becomes wasteful. For like reasons the optimum temperature with diethyl peroxide is from 100° to 200° C. If the gas density of the vinyl fluoride in the polymerization system is increased by increasing the pressure or decreasing the temperature while holding the other variables constant, the molecular weight of the resulting product is, in general, increased, and this is manifested by certain changes in properties such as increased melt viscosity. To obtain a product of a given viscosity at a higher temperature it is thus necessary to use a higher pressure.

In carrying out the reaction it is desirable to equip the reaction system with devices for recording and controlling the internal temperature and pressure, and to provide a means of agitation. A stirring device may be employed, such as a motor driven stirrer operating through a stuffing box. More conveniently a shaking or rocking motion may be imparted to the reactor itself, and a movable solid or liquid within the reactor may then be used to aid the agitation of the gas phase. Since the best operating temperatures are above the critical temperature of vinyl fluoride, it is preferable to use a liquid medium to facilitate agitation of the gaseous phase and to act as a heat transfer agent, thus assisting in controlling the reaction temperature. A safety rupture disc should be included in the reaction system to ensure that the safe operating pressure of the equipment is not exceeded. The reaction is exothermic, and if the temperature is not properly controlled a rapid rise in temperature and pressure may occur. Water is especially useful as a reaction medium because higher molecular weight polymers are obtained than with other media and because the presence of water helps to prevent such flash reaction by virtue of its high specific heat and its ability to conduct heat from the gas phase to the walls of the reaction vessel. The polymerization is attended by a drop in pressure, and the pressure may be maintained constant or within a desired range by continuously or intermittently injecting additional quantities of the compressed monomer or the liquid medium into the reactor. The course of the reaction may be followed by observing the quantity of material injected to keep the pressure constant or by injecting intermittently and noting the rate at which the pressure falls between injections.

The polyvinyl fluoride is usually obtained from the reactor in the form of a powder or a porous cake, and it may be washed with water or an organic solvent and dried in vacuum. It is shown to be orientable by means of a simple test. A filament or a narrow strip of pressed film is subjected to a longitudinal stress. It elongates up to several hundred per cent, namely, at least 100% and up to 400% or more, in contrast to unorientable polyvinyl fluoride which elongates only a few per cent until the ultimate tensile strength is exceeded and the sample breaks. It is necessary that an adequately fused sample be used in the test, and this is suitably obtained from a film prepared by subjecting the polymer to a temperature of 200° C. and a pressure of about 10,000 lbs./sq. in. for 3 to 5 minutes. Before orientation the polyvinyl fluoride shows an X-ray diffraction pattern characteristic of a crystalline powder, while the oriented polyvinyl fluoride shows the pattern characteristic of an oriented fiber. The orientable polyvinyl fluoride can also be oriented by rolling or pressing in such a way as to produce elongation. The type of elongation occurring when a filament of orientable polymer is stretched in the solid state, namely, at a temperature below its softening temperature, is known as cold drawing and is characterized by the fact that the sample acquires a permanent elongation. In addition to the change in structure indicated by the X-ray diffraction diagram, there is an increase in the tensile strength measured in the direction of elongation and an increase in the stiffness or modulus of elasticity.

Orientable polyvinyl fluoride can be obtained in film form by casting from solvents as well as by hot-pressing. The films are usually stiff and insensitive to moisture, but yet are flexible and tear-resistant. Other advantageous properties of orientable polyvinyl fluoride will become apparent from the description given in the examples.

Vinyl fluoride monomer can be prepared in several ways, a convenient process being that of United States Patent 2,118,901. Oxygen and acetylene are generally undesirable impurities and should be reduced to a practical minimum by careful distillation or scrubbing with suitable agents, e. g., ammoniacal cuprous chloride solution.

Quantities of oxygen and acetylene ranging up to about 1500 parts per million of each based on vinyl fluoride can be tolerated, and it is in some cases advantageous to employ samples of vinyl fluoride monomer which contain oxygen and acetylene in proportions of not more than 10 to 1000 parts per million each. It is likewise desirable to remove oxygen from the apparatus prior to the operation by evacuation or sweeping with an inert gas such as nitrogen. Water, if used, should be pure and free of dissolved oxygen. Distilled water which has been boiled and stored under pure nitrogen is satisfactory.

The invention is further illustrated by the following examples in which the parts are by weight.

*Example I*

A cylindrical reactor fabricated of stainless steel and designed to withstand a pressure in excess of 1000 atmospheres is flushed with pure oxygen-free nitrogen and charged with 25 parts of deoxygenated water and 0.1 part of benzoyl peroxide. The water occupies approximately one-fourth of the total internal volume of the reactor. The reactor is then closed by a head bearing an inlet valve and a thermocouple well, using an aluminum gasket at the point of closure. The nitrogen is removed from the reactor by evacuating to constant pressure, and the reactor is then placed in a reciprocating mechanism designed to produce vigorous agitation of the contents. The reactor is provided with external heating and cooling devices which may be operated both manually and by an automatic temperature recording and controlling instrument which is connected with a thermocouple inserted in the thermocouple well. The inlet valve is opened to a flexible high pressure line which is connected to a pressure gauge and a safety rupture disc designed to blow out at a pressure slightly above 1000 atmospheres. This system is connected through a valve to a storage vessel containing vinyl fluoride under a pressure of about 1000 atmospheres, and it is carefully flushed with vinyl fluoride from the storage before opening the inlet valve to the reactor. Acetylene-free vinyl fluoride containing about 500 P. P. M. of oxygen is employed, and the pressure in the storage vessel is maintained by injecting pure water at the bottom, while the vinyl fluoride is withdrawn as needed from the top.

Vinyl fluoride is admitted to the reaction system from the high pressure storage to provide a pressure of about 50 atmospheres at room temperature, and heating and agitation are begun. When the internal temperature reaches 80° C., the pressure in the reactor is raised stepwise to 900 atmospheres by injection of the requisite further quantity of vinyl fluoride. The reaction gathers velocity, as evidenced by an increasingly rapid drop in pressure, and it may be necessary to cool the reaction vessel to prevent a rise in temperature. The temperature is maintained at 80° C. and additional vinyl fluoride is injected as often as required to maintain the pressure within the range of 800–960 atmospheres. The sum of the individual pressure drops occurring during the periods between repressuring operations in the next five hours is about 335 atmospheres. During an additional 1.5 hours at 80° C. and 940 atmospheres there is no further drop in pressure, showing that the catalyst is exhausted. The reaction vessel is then cooled to room temperature, the unreacted vinyl fluoride monomer is bled off, and the contents of the reactor are discharged. Eleven parts of polyvinyl fluoride is obtained in the form of a white cake which is washed with water and dried under reduced pressure at 100° C.

When heated on a copper block, the polyvinyl fluoride obtained as described above does not noticeably soften until a temperature of about 200° C. is reached, the softening range being about from 175° to 200° C. Pressing between aluminum foils at 200° C. under pressure, for example from 10,000–15,000 lbs./sq. in. or higher pressure for 1–5 minutes is sufficient to mold the polymer into a clear, tough film. Such a film sticks to a copper block slightly when heated under a pressure of about 0.1 kg./sq. cm. at 175° C., but this type of softening (sticking) is slow to develop at this temperature and does not become noticeable until a temperature of 190° C. is reached. The polymer is orientable and is distinguished from polyvinyl fluoride as hitherto obtained by cold drawing at least 100% of its original length. Thus narrow strips of the pressed film neck down sharply, and cold draw to an elongation of 300–400% or more when stress is applied at room temperature. The drawn sample shows the characteristic diagram of an oriented fiber when examined by X-ray diffraction methods. It retracts about 15% in boiling water, or if "set" by preliminary immersion in boiling water while under tension, it shrinks only about 4%. It has a tensile strength well in excess of 14,000 lbs./sq. in., as compared with 4500–5500 lbs./sq. in. for the undrawn material.

The pressed film is quite stiff, having a bending modulus of elasticity of approximately $.14 \times 10^6$ lbs./sq. in., which is independent of the relative humidity of the atmosphere and is not affected by prolonged soaking in water. The oriented film is several times as stiff. This stiffness is remarkably high in view of the toughness of the polymer. The film is not shattered by sudden intensive shock, and is difficult to tear. A 10 mil film can be bent double, first in one direction and then in the other, along the same line for more than 100 times without breaking. Almost without exception, other polymers of equivalent stiffness fail rapidly in this test. While immersed in a bath of dry ice and acetone at a temperature of —80° C., the film can be suddenly bent double without breaking. The impact strength, determined by the Charpy method on a 0.1" thick bar molded at 200° C. and 4000 lbs./sq. in. for 2 minutes and notched in the manner described in the A. S. T. M. Standards 1941 suppl., III, 342, is greater than 10 ft. lbs. per inch of notch.

The polymer in either its oriented or unoriented state does not absorb water, and even in finely divided form is not hydrolyzed by prolonged boiling with water. It is insoluble in petroleum ether, iso-octane, xylene, mineral oil, chloroform, carbon tetrachloride, glacial acetic acid, acetone, ethanol, and methanol. It is soluble in hot cyclohexanone, dimethyl formamide, tetramethylene sulfone, or nitroparaffins, and clear tough films may be obtained from these solutions by casting onto a hot smooth surface. The previously known polyvinyl fluoride, on the other hand, is incapable of being formed into tough films.

The solution viscosities of polyvinyl fluoride samples are conveniently compared using hot cyclohexanone as the solvent. In order to make valid comparisons between samples it is necessary to adopt a definite heating schedule for dissolving the polymer and measuring the efflux time of the sample through the capillary pipette, since cyclohexanone itself undergoes a gradual change in viscosity at elevated temperatures. The polymer is dissolved by stirring at the reflux temperature for 75 minutes and the relative viscosity is measured in a bath at 144° C. after 75 minutes. It is to be understood that the figures mentioned herein expressing intrinsic viscosity, which is a measure of molecular weight, are determined in this manner. The intrinsic viscosity of the orientable polyvinyl fluoride prepared in accordance with this example is 1.56 as determined using a solution of .0624 g./100 ml. of cyclohexanone. The intrinsic viscosity, $[\eta]$, is derived from the equation $$[\eta] = \frac{\log_e \eta \text{ rel.}}{C}$$

where $\eta$ rel. is the relative viscosity and C is the concentration of polymer in grams per 100 ml. of solvent. The products of this invention are characterized by an intrinsic viscosity of at least 0.35, and commonly, 1.0 to 4.5, as compared to a value of 0.30 which is about the maximum intrinsic viscosity of polyvinyl fluoride prepared with peroxy catalyst at pressures below 150 atmospheres.

*Example II*

The polymerization of acetylene-free vinyl fluoride containing about 500 P. P. M. oxygen is carried out as described in Example I except that the temperature used is 55° C., the pressure being maintained in the range 850–955 atmospheres. The product is 5 parts of orientable polyvinyl fluoride which is generally similar in physical properties to the product of Example I. The intrinsic viscosity is 1.73 (0.25 g./100 ml. cyclohexanone; dissolved by stirring at reflux temperature for 75 minutes and measured in bath at 144° C. after 75 minutes).

A pressed film about 15 mils thick, when exposed to ultra-violet light in the Fade-Ometer for 48 hours, is slightly yellowed, but its tensile strength (approximately 4500 lbs./sq. in.) is not diminished. Continued exposure for 414 hours causes no further change in color, and the tensile strength is reduced only to 4000 lbs./sq. in. In the same test vinyl chloride polymers are seriously darkened and weakened by exposure for 48 hours.

The thermal stability of orientable polyvinyl fluoride is demonstrated by heating a sample of the pressed film between aluminum foils under a pressure of 5000–10,000 lbs./sq. in. at 200° C. for 5 minutes. The polymer obtained from oxygen-containing vinyl fluoride as described in Example I is slightly discolored by this treatment but its toughness is unchanged, while the polymer obtained from highly purified vinyl fluoride as described in Examples III, IV, and V is not even discolored. Chlorine-containing polymers such as vinyl chloride polymer and vinylidene chloride polymer and also related interpolymers are seriously darkened and weakened by this treatment.

Examples III, IV, and V show the manner in which temperature and pressure are adjusted to obtain orientable polyvinyl fluoride having a desired viscosity from vinyl fluoride monomer containing no acetylene and less than 20 P. P. M. of oxygen. They also illustrate the injection of water rather than monomer to maintain the reaction pressure within the desired range.

*Example III*

A silver-lined high pressure reactor is swept with oxygen-free nitrogen and charged with 200 parts of deoxygenated distilled water and 0.2 part of benzoyl peroxide, the liquid charge occupying approximately one-half of the total internal volume of the reactor. The reactor is closed, the nitrogen is removed by evacuation to constant pressure, and 100 parts of vinyl fluoride containing no acetylene and less than 20 P. P. M. of oxygen is admitted through the valve, cooling the reactor if necessary. The reactor is then placed in a reciprocating agitator, fitted with temperature recording and controlling devices, and connected through flexible steel high pressure tubing to a pressure gauge, rupture disc assembly, and a valve through which pure deoxygenated water may be admitted from a storage reservoir maintained at approximately 1000 atmospheres pressure. Agitating and heating are begun. When the internal temperature reaches 80° C. (after about 0.5 hour) the pressure within the reactor is quickly raised from about 150 atmospheres to 500 atmospheres by the injection of water. Thereafter the temperature is maintained within a range of 80°–83° C. and water is injected as often as necessary to maintain the pressure within the range 400–500 atmospheres. The reaction velocity as followed by the drop in pressure during the periods between repressuring, increases during the first hour (pressure drop 100 atmospheres), reaches a maximum during the second hour (pressure drop 320 atmospheres), and then gradually diminishes, becoming negligible after about 10 hours. The individual pressure drops during the ten hours total 890 atmospheres. The reactor is cooled, the unreacted vinyl fluoride is bled off, and the polyvinyl fluoride is removed, washed with water, and dried. This vinyl fluoride polymer, 61 parts, is orientable, and in its physical properties it is generally similar to the product of Example I except that its viscosity is somewhat higher. The intrinsic viscosity, determined in cyclohexanone solution as described in Example II is 2.10. The polymer does not flow as easily as that of Example I under pressure at 200° C. and as a result is less readily molded. The pressed films are somewhat more difficult to cold draw because they yield only under a relatively higher stress and do not neck down sharply.

It is seen by comparison with Example I that the yield and certain of the properties of orientable polyvinyl fluoride obtained at a given temperature and pressure can be considerably influenced by small traces of impurities. In this case, reducing the oxygen in the monomer from about 500 to less than 20 P. P. M. resulted in an increased yield of a product having higher viscosity. Other factors, such as the size and shape of the reactor, catalyst concentration, liquid medium or solvent used, etc., can also cause minor variations in the viscosity of the polymer. However, with a given reaction system and monomer sample, it is possible to obtain polyvinyl fluoride of a desired viscosity by adjustment of the temperature or pressure as illustrated in the following examples.

*Example IV*

The use of a higher reaction temperature, as shown by this example, results in a lower yield of a polyvinyl fluoride having lower viscosity. The reaction is carried out as in Example III with the modification that the reaction temperature employed is 100° C. Heating the reactor to reach an internal temperature of 100° C. requires about 0.75 hour, and the reaction is essentially complete within two hours at the reaction temperature, as indicated by the cessation of pressure drop. The total of the individual pressure drops is about 300 atmospheres. The polyvinyl fluoride, 31 parts, is orientable, and has an intrinsic viscosity, determined as in Example II, of 1.73. It flows under pressure at 200° C., and can be compression molded at this temperature or pressed into films which are easily cold drawn.

The pressed film has a high dielectric strength (>1360 volts per mil for a 7.5 mil film) as determined by the short-time method given in the A. S. T. M. Standards (1940 suppl. vol. 3, p. 257), using 60 cycle alternating current and cylindrical brass electrodes 1" long and 2" in diameter with edges rounded to a radius of ¼".

By suspending the polyvinyl fluoride in a medium such as carbon tetrachloride and treating with chlorine, a chlorinated polyvinyl fluoride is obtained which has greater solubility in organic solvents and a lower softening temperature than the original polyvinyl fluoride.

Example V

As demonstrated by this example the use of a lower pressure with other reaction variables unchanged results in a decreased yield of a polyvinyl fluoride having lower viscosity. The reaction is carried out as in Example III with the one modification that the pressure range maintained is 160–200 atmospheres at 80° C. The pressure drop is slow, and it is necessary to repressure only once during the 16 hours required for completion of the reaction. The total pressure drop is 70 atmospheres, and the product is 17 parts of orientable polyvinyl fluoride which has an intrinsic viscosity, determined as in Example II, of 1.29. The polymer flows readily in compression molding at 200° C.

Vinyl fluoride polymer prepared at 80° C. and 100–125 atmospheres pressure has an intrinsic viscosity of less than 0.35 and is not orientable, and films pressed from this unorientable product are brittle and weak.

The following example illustrates the use of diethyl peroxide as a polymerization catalyst.

Example VI

A silver-lined reactor is charged with 200 parts of deoxygenated distilled water, 0.08 part of diethyl peroxide, and 100 parts of vinyl fluoride. The technique used in charging and operating the equipment is the same as that described in Example III with the exception that in order to prevent loss of the diethyl peroxide the reactor is not evacuated. During the heating period when the temperature reaches 62° C. the pressure is raised to 275 atmospheres by injection of water and heating is continued until a temperature of 127° C. is reached. Additional water is then injected and the pressure is maintained within the range 300–600 atmospheres by intermittent injection of water while the temperature is maintained within the range 127°–137° C. Reaction is 80% complete within one hour, and after 8.5 hours the reaction is terminated and the product is discharged. The polyvinyl fluoride is obtained in the form of a dense, tough cake, which is not completely soluble in boiling dimethyl formamide. It has good flow characteristics for compression molding and gives smooth, clear, tough films when pressed at 200° C. for 3 minutes at 10,000 lbs./sq. in.

When the reaction is carried out using a similar charging procedure but with the modification that the temperature maintained is 168°–171° C. and the pressure is 500–600 atmospheres, the product is 7.5 parts of polyvinyl fluoride which is completely soluble in boiling dimethyl formamide, having a relatively viscosity of 1.212 (0.25% in cyclohexanone at 144° C.), corresponding to an intrinsic viscosity of 0.8. Films pressed at 200° C. for 3 minutes at 10,000 lbs./sq. in. from this product show very good flow and cold drawing properties and are tough.

Example VII

The following example illustrates the use of a constant pressure throughout the reaction maintained by injection of vinyl fluoride monomer.

A silver-lined reactor is swept with oxygen-free nitrogen and charged with 200 parts of deoxygenated water and 0.2 part of benzoyl peroxide. It is then closed, nitrogen is removed by evacuation, and 100 parts of vinyl fluoride containing 20 P. P. M. of oxygen and a trace of acetylene (less than 50 P. P. M.) is admitted. It is placed in a reciprocating agitator, fitted with temperature recording and controlling instruments, and connected to a vinyl fluoride filled system comprising a pressure gauge, rupture disc assembly, and a high pressure storage vessel containing monomeric vinyl fluoride of the same purity. Heating and agitation are begun, and when the temperature within the reactor reaches 78° C. additional vinyl fluoride is injected to raise the pressure in the system to 250 atmospheres by admitting pure deoxygenated water into the bottom of the vinyl fluoride storage system. Reaction sets in and the temperature is maintained at 80° C., and the water is injected as rapidly as necessary to maintain the pressure in the vinyl fluoride system at 250 atmospheres. The maximum range in pressure during the reaction is 250–260 atmospheres. The reaction is followed by the rate at which the water is injected to maintain the pressure, and after 15 hours the reaction is complete, 80% of the polymerization having occurred during the first 7 hours.

The reactor is cooled, pressure is released, and the product is discharged. It is a white cake consisting of 62 parts of polyvinyl fluoride after washing and drying. Its relative viscosity (0.25% in cyclohexanone at 144° C.) is 2.775, corresponding to an intrinsic viscosity of 4.1. In spite of its high viscosity, the polyvinyl fluoride is completely soluble in hot dimethyl formamide to the extent of 10–20%, and these solutions when poured on a smooth surface and warmed to drive off the solvent give tough films, which when "quenched" by bringing to a temperature above the softening temperature and quickly cooling, are clear, transparent, colorless, and remarkably free from optical graininess. These films have tensile strengths of 7000–9000 lbs./sq. in. based on original dimensions and drawn samples have tensile strengths as high as 33,000 lbs./sq. in. The bending modulus of elasticity of these films varies from 0.15 to $0.17 \times 10^6$ lbs./sq. in. depending on the thickness. This high viscosity polymer is excellent not only for handling by solution techniques but for compression molding applications.

Example VIII

A sample of vinyl fluoride prepared from acetylene and hydrogen fluoride and which contains quantities of acetylene in excess of 0.1% is passed through a scrubbing tower containing an ammoniacal solution of cuprous chloride. The vinyl fluoride is then passed through a tower containing dilute sulfuric acid followed by drying by means of calcium chloride and phosphoric anhydride. The vinyl fluoride thus obtained is shown to be acetylene free and contains, upon analysis, 500 parts per million of oxygen by volume. The oxygen is introduced during the washing and drying operation.

A silver-lined high pressure reactor similar to that described in Example III is charged with 0.2 part of benzoyl peroxide, thoroughly flushed with nitrogen, closed and evacuated. There is then added 0.1 part of acetylene and 100 parts of vinyl fluoride obtained as described above and which on a weight basis contains a total of 0.035 part of oxygen and 200 parts of oxygen free distilled water is introduced. This fills approximately one-half of the free space of the reactor. Heating and agitation is begun and when the internal temperature reaches 60° C., a further quantity of water is introduced to bring the pressure to 600 atmospheres. The temperature is raised and maintained at approximately 100° C. and the pressure is maintained at 425–950 atmospheres by injection of water from time to time. After 12 hours the pressure becomes constant, showing completion of the polymerization reaction, and the reactor is cooled, the pressure released, and the product, containing 30 parts of polyvinyl fluoride, is discharged.

The polyvinyl fluoride upon pressing for 3 minutes at 200° C. and 10,000 lbs./sq. in. gives a tough nearly colorless film.

*Example IX*

A stainless steel reactor is swept with oxygen-free nitrogen and is charged with a solution of 6 parts of benzoyl peroxide and 0.5 part of didodecyl acid phosphate in 2000 parts of methanol, and 2500 parts of deoxygenated distilled water is added. The water precipitates the benzoyl peroxide and didodecyl acid phosphate in finely divided active form. The reactor is evacuated to remove the nitrogen and 5000 parts of acetylene-free vinyl fluoride monomer containing 15 parts per million of oxygen is added. The reactor is connected as in Example I to a thermocouple and an inlet valve which connects through a flexible high pressure tube to a safety rupture disc assembly and a storage vessel containing vinyl fluoride monomer under a pressure of about 1000 atmospheres.

The reactor is agitated as a unit by a rocking mechanism and external heat is applied. When the internal temperature reaches 60° C., additional monomer is admitted from the storage tank to bring the pressure to 175 atmospheres. When the internal temperature reaches 80° C., it is held constant for the remainder of the polymerization cycle and the pressure is maintained within the range of 230–250 atmospheres by adding monomer from the storage tank.

After about 8 hours the reaction is practically finished since no further appreciable pressure drop is observed. The reactor is cooled to room temperature and 4250 parts of liquid (water, methanol, etc.) are drawn off. The remaining vinyl fluoride monomer is bled off to a recovery system and the product, polyvinyl fluoride, is obtained as 160 parts of a friable white cake. This product is orientable and when subjected in the form of a filament to tensile stress is capable of being drawn into a pliable fiber showing by characteristic X-ray pattern molecular orientation along the fiber axis. The intrinsic viscosity of the polymer determined according to the method in Example I is 0.7.

This polymer can be stabilized against thermal degradation and discoloration by incorporating up to 2% by weight of the polymer of an acid accepting organic compound. The polyvinyl fluoride can be readily injection molded at an injection cylinder temperature of 210° C. to yield tough objects which are characterized by high impact strength and are undistorted by heat at temperatures up to 150° C.

The orientable polyvinyl fluoride disclosed herein has, in addition to capability of being cold drawn or cold rolled into oriented products, an unusual combination of stiffness, toughness, and resistance to moisture, solvents, heat, cold, light, and other environmental conditions which set it far above the products previously known to the art. For example, orientable polyvinyl fluoride can be formed into films which are pliable even at −80° C. whereas the previously known vinyl fluoride polymer is brittle at room temperature. Orientable polyvinyl fluoride can also be molded under heat and pressure to give bars having impact strengths in excess of 1 ft. lb. per inch of notch according to the A. S. T. M. Standards, 1941, suppl. III, page 342.

A liquid polymerization medium, although not necessary, is beneficial in dispersing the catalyst and in controlling the reaction temperature by dissipating the liberated heat. Water is especially useful for this purpose. Certain organic liquids can be employed as polymerization media. The polymer properties, such as softening temperature, solubility, and stiffness, may be modified within limits by the use of such media as benzene, methyl alcohol, ethyl alcohol, tertiary butyl alcohol, 1,3-dioxolane, ketones, aldehydes, esters, ethers, etc. Some organic compounds, particularly compounds containing iodine or a multiplicity of chlorine or bromine atoms on a single carbon atom, for example chloroform and carbon tetrachloride, react with the vinyl fluoride under appropriate conditions to produce relatively low molecular weight compounds known as telomers. These compounds should not be present in large proportions if orientable polyvinyl fluoride is to be formed. Aqueous media, used alone or in combination with organic agents, have the advantage that buffers and dispersing agents may be employed. Soaps, alkanesulfonic acids or their salts, sodium alkyl sulfates, quaternary ammonium salts containing a long hydrocarbon chain, alkyl betaines, long chain primary alcohols, etc., may be used in aiding the dispersion, and it is possible to obtain the polyvinyl fluoride in the form of an emulsion or latex.

The apparatus must be constructed of a material (for example steel) which can be fabricated in a form capable of withstanding the high pressures required, but the polymerization chamber itself may be lined with any material such as stainless steel, silver, nickel, lead, aluminum, tantalum, platinum, palladium, rhodium, chromium, glass, porcelain, or enamel, which will not adversely affect the rate of polymerization or the quality of the product.

Orientable polyvinyl fluoride may be obtained batchwise without the use of compressors, etc. by charging a cooled pressure vessel with the catalyst and a quantity of liquefied vinyl fluoride monomer sufficient to develop a pressure in excess of 150 atmospheres when the closed vessel is warmed to the polymerization temperature. For commercial operation, however, it is desirable to repressure during the reaction by injecting monomer or a suitable liquid medium (e. g. water or organic solvent) into the reaction vessel. The injection may be carried out intermittently, maintaining the pressure within a desired range, or continuously at the rate required to maintain a constant pressure. It is generally desirable to control the pressure within rather narrow limits, as wide fluctuations in pressure result in a relatively inhomogeneous product. The process is adaptable to continuous operation as the catalyst may be injected along with the monomer or in solution in a liquid medium, and the polymer may be separated from the unreacted monomer and withdrawn by a suitable series of traps or valves while the unreacted monomer is recycled.

The orientable polyvinyl fluoride described herein is useful in the form of fibers and filaments for sutures, ligatures, threads, yarns, string, cordage, rope and other fibrous products. These forms are superior substitutes for silk, wool, cotton, flax, hemp, hair, bristle, gut and other natural fibrous materials in many applications. In most fiber applications the oriented or partially oriented form is preferred, although unoriented filaments are also of value. Fabrics knitted or woven from orientable polyvinyl fluoride fibers are highly resistant to wear, deterioration and attack by common chemicals and solvents. The orientable polyvinyl fluoride is likewise extremely useful in the form of films, foils, sheets, ribbons, bands, rods, tubing and molded objects, and as a coating for fabrics, leather, cellulose products, etc. Tough molded objects of this polymer can be prepared by compression or injection molding techniques at temperatures above the softening temperature of the polymer and also by forming a desired shape from powdered orientable polyvinyl fluoride in a mold below the softening temperature of the polymer and then removing the article from the mold and sintering at elevated temperature preferably in the range of 150° to 400° C. Molded masses of the polymer may be used for turnery objects and may also be used for the preparation of films, tapes, fibers, etc. by turning against a suitable tool. Because of their dimensional stability films of polyvinyl fluoride are excellent as a base for photographic emulsions. Orientable polyvinyl fluoride can also serve as electrical insulating material in applications involving exposure to solvents, moisture, heat, etc., and where high mechanical strength is desired. For certain electrical applications the polymer is well suited for the bonding of mica flakes into tough, coherent shapes. In some of these uses the polyvinyl fluoride is advantageously combined with or prepared in the presence of plasticizers, modifiers, softeners, dyes, pigments, fillers, and natural or synthetic resins.

As many apparently widely different embodiments of this invention may be made without departing from the spirit and scope thereof, it is to be understood that we do not limit ourselves to the specific embodiments thereof except as defined in the appended claims.

We claim:

1. A process for making polymers which comprises heating polymerizable material consisting of vinyl fluoride in contact with from 0.005% to 5% based on the weight of the vinyl fluoride of an organic peroxy compound under a pressure of from 150 to 2000 atmospheres and at a reaction temperature which is within the range of 50° to 200° C. and which is at least as high as the dissociation temperature of said peroxy compound, and continuing the heating under said temperature and pressure until the vinyl fluoride is polymerized.

2. A process for making polymers which comprises heating polymerizable material consisting of vinyl fluoride in contact with a liquid polymerization medium and with from 0.005% to 5% based on the weight of the vinyl fluoride of an organic peroxy compound under a pressure of from 150 to 2000 atmospheres and at reaction temperature which is within the range of from 50° C. to 200° C. and at least as high as the dissociation temperature of said peroxy compound, and continuing the heating under said temperature and pressure until the vinyl fluoride is polymerized.

3. The process set forth in claim 1 in which said peroxy compound is benzoyl peroxide.

4. The process set forth in claim 1 in which said peroxy compound is diethyl peroxide.

5. The process set forth in claim 2 in which said peroxy compound is benzoyl peroxide.

6. The process set forth in claim 2 in which said peroxy compound is diethyl peroxide.

7. The process set forth in claim 1 in which said peroxy compound is a dialkyl peroxide and in which the temperature is from 100° C. to 200° C.

8. The process set forth in claim 2 in which said peroxy compound is a dialkyl peroxide and in which the temperature is from 100° C. to 200° C.

9. A xylene-insoluble polyvinyl fluoride which has an intrinsic viscosity of at least 0.35 and which, when in the form of a filament, is capable of being cold drawn to a permanent elongation of at least 100% from a molecularly unoriented state exhibiting an X-ray diffraction pattern characteristic of a crystalline powder to a molecularly oriented state showing by X-ray diffraction patterns orientation along the fiber axis.

10. A xylene-insoluble polyvinyl fluoride which has an intrinsic viscosity of at least 0.35, said polyvinyl fluoride being in the form of a permanently elongated structure showing by characteristic X-ray diffraction patterns longitudinal molecular orientation.

11. The polyvinyl fluoride set forth in claim 10 in the form of a self-supporting film.

12. The polyvinyl fluoride set forth in claim 10 in the form of a filament.

DONALD D. COFFMAN.
THOMAS A. FORD.

REFERENCES CITED

The following references are of record in the file of this patent:

UNITED STATES PATENTS

| Number | Name | Date |
| --- | --- | --- |
| 2,224,663 | Berg et al. | Dec. 10, 1940 |
| 2,279,884 | D'Alelio | Apr. 14, 1942 |
| 1,425,130 | Plauson | Aug. 8, 1922 |
| 2,362,960 | Thomas | Nov. 14, 1944 |

OTHER REFERENCES

Starkweather, article in Jour. Am. Chem. Soc., vol. 56, pages 1870–1874 (1934).